(12) United States Patent
Bailey et al.

(10) Patent No.: US 8,007,898 B2
(45) Date of Patent: Aug. 30, 2011

(54) ROOFING MATERIAL WITH DIRECTIONALLY DEPENDENT PROPERTIES

(75) Inventors: Kirk Matthew Bailey, Brigham City, UT (US); Mark Earl Ewing, Perry, UT (US)

(73) Assignee: Cool Angle LLC, Brigham City, UT (US)

( * ) Notice: Subject to any disclaimer, the term of this patent is extended or adjusted under 35 U.S.C. 154(b) by 0 days.

(21) Appl. No.: 12/898,713

(22) Filed: Oct. 6, 2010

(65) Prior Publication Data

US 2011/0183112 A1   Jul. 28, 2011

(51) Int. Cl.
*D06N 7/04* (2006.01)
*B32B 5/00* (2006.01)
*B05D 1/12* (2006.01)
*B05D 7/00* (2006.01)

(52) U.S. Cl. .......... 428/143; 428/98; 428/141; 428/144; 427/186; 427/214

(58) Field of Classification Search .................... 428/143
See application file for complete search history.

(56) References Cited

U.S. PATENT DOCUMENTS

| | | | |
|---|---|---|---|
| 2,188,454 A * | 1/1940 | Braddock | 52/531 |
| 2,379,358 A | 6/1945 | Jewett | |
| 2,732,311 A | 1/1956 | Hartwright | |
| 3,001,331 A | 9/1961 | Brunton | |
| 4,111,188 A | 9/1978 | Murphy | |
| 4,416,940 A * | 11/1983 | Loye et al. | 428/324 |
| 4,583,486 A | 4/1986 | Miller | |
| 5,303,525 A | 4/1994 | Magee | |
| 5,511,537 A | 4/1996 | Hively | |
| 6,014,847 A | 1/2000 | Phillips | |
| 6,289,648 B1 | 9/2001 | Freshwater et al. | |
| 6,399,631 B1 | 6/2002 | Elliott | |
| 6,523,316 B2 | 2/2003 | Stahl et al. | |
| 6,715,252 B2 | 4/2004 | Stahl et al. | |
| 6,933,007 B2 | 8/2005 | Fensel et al. | |
| 7,241,500 B2 | 7/2007 | Shiao et al. | |
| 7,291,358 B1 | 11/2007 | Fensel et al. | |
| 7,422,989 B2 | 9/2008 | Kalkanoglu et al. | |
| 7,452,598 B2 | 11/2008 | Shiao et al. | |
| 7,592,066 B2 | 9/2009 | Shiao et al. | |
| 7,638,164 B2 | 12/2009 | Aschenbeck | |
| 7,648,755 B2 | 1/2010 | Gross et al. | |
| 7,665,261 B2 | 2/2010 | Elliott et al. | |
| 2005/0238848 A1 | 10/2005 | Fensel et al. | |
| 2007/0110961 A1* | 5/2007 | Fensel et al. | 428/143 |

(Continued)

FOREIGN PATENT DOCUMENTS

WO   WO2006119567   11/2006

OTHER PUBLICATIONS

Author Unknown. Definition of Solar. Apr. 6, 2011, Merriam Webster Online Dicationary.*

(Continued)

*Primary Examiner* — David Sample
*Assistant Examiner* — Nathan Van Sell
(74) *Attorney, Agent, or Firm* — Jeffrey T. Holman

(57) ABSTRACT

Roofing material with an irregular surface and tailored radiation properties and tailored aesthetic properties in separate directions, simultaneously. This provides enhanced thermal performance in the sun direction and aesthetically pleasing visual appearance from viewing directions.

19 Claims, 4 Drawing Sheets

U.S. PATENT DOCUMENTS

| | | |
|---|---|---|
| 2008/0008832 A1 | 1/2008 | Shiao et al. |
| 2008/0241472 A1* | 10/2008 | Shiao et al. ............ 428/144 |
| 2009/0047474 A1* | 2/2009 | Gross et al. ............ 428/144 |
| 2009/0117329 A1 | 5/2009 | Leitch et al. |
| 2009/0317593 A1 | 12/2009 | Smith et al. |
| 2010/0104857 A1 | 4/2010 | Joedicke |
| 2010/0151199 A1 | 6/2010 | Shiao et al. |
| 2010/0192501 A1 | 8/2010 | Koch et al. |
| 2010/0203336 A1 | 8/2010 | Shiao et al. |
| 2010/0205898 A1 | 8/2010 | Rodrigues et al. |
| 2011/0000152 A1 | 1/2011 | Botke |

OTHER PUBLICATIONS

Author Unknown. Definition of Thermal. Apr. 6, 2011, Merriam Webster Online Dicationary.*

* cited by examiner

ROOFING MATERIAL WITH DIRECTIONALLY DEPENDENT PROPERTIES

CROSS-REFERENCE TO RELATED APPLICATIONS

Not Applicable

FEDERALLY SPONSORED RESEARCH OR DEVELOPMENT

Not Applicable

SEQUENCE LISTING OR PROGRAM

Not Applicable

BACKGROUND

1. Field

This application relates to roofing materials, and more particularly to roofing materials having tailored radiation properties and tailored aesthetic properties in separate directions, simultaneously.

2. Prior Art

Roofing

Several types of roofing material are commercially available including asphalt shingles, wood shingles, metal roofing, slate, clay tiles, built-up roofs, roll roofing, polyurethane foam, single-ply roof membranes and others. Asphalt shingles are by far the most commonly used in the U.S. for residential sloped-roof applications. Asphalt shingles are constructed of a felt or fiberglass mat that is saturated with asphalt and covered with granules which are adhered to the mat. Advantages of this type of roofing include its low cost, durability, aesthetic variety (colors, shading, layers and textures), as well as ease of installation and repair. The granules of asphalt shingles are generally derived from a hard mineral base rock such as slate, basalt or nephelite, and are typically ground to a particle size of about 10 to 35 US mesh. Granules are typically coated prior to being applied to shingles to achieve a variety of desired properties. This has been done for many years as illustrated by U.S. Pat. No. 2,379,358 (1945) to Jewett.

Aesthetic Properties

The aesthetic properties of roofing systems play a primary role in marketing. As a result, asphalt shingles are often tailored to achieve certain appearances. This tailoring is typically accomplished through uniform granule coating and by applying a mixture of granules in various color schemes and patterns and/or layering shingles to simulate more traditional, and in most cases more expensive, forms of roof coverings such as wooden shakes, slate or tile. Examples of these methods are described in U.S. Pat. Nos. 7,665,261 (2010) to Elliott et al., 6,289,648 (2001) to Freshwater et al. and 6,014,847 (2000) to Phillips with the layering approach emphasized in U.S. Patent Application Publications 2010/0205898 and 2010/0192501 and U.S. Pat. No. 6,698,151 (2004) to Elliott. U.S. Pat. Nos. 6,715,252 (2004) and 6,523,316 (2003), both to Stahl et al., describe the combination of coloring and layering with colors changing at edges facing specific directions to achieve a sharp, precise delineation between zones of different shadings in an interesting effort to simulate the depth of more expensive shingles. U.S. Pat. Nos. 7,638,164 (2009) to Aschenbeck and 4,583,486 (1986) to Miller describe methods for accurate granule placement in complex patterns to achieve desired aesthetics. Darker and multi-toned shingles remain preferred in the market place. The visual appearance of a material is strongly influenced by the surface properties, including color, tone, reflectivity, and surface irregularities and their orientation. The resulting properties of all tailoring for visual effect, is referred to herein as "tailored aesthetic properties."

The effective directional dependence of appearance is strongly influenced by surface properties and orientation. Methods described in the prior art to improve the visual appearance do so with large-scale efforts apparently without considering that these properties can be tailored to have directional preference at the granule level.

Roof Temperatures

While the aesthetics of a roofing system remain of primary marketing importance, effective service life has always been important and energy considerations are becoming increasingly important in the selection of roofing materials. In particular, roofs that reflect large amounts of solar radiation are becoming favored because they reduce the temperature of the shingles thereby extending the service life of the shingles and reducing the cooling loads for the building. In addition, as described in U.S. Pat. No. 7,648,755 (2010) to Gross et al., hotter roofs in metropolitan areas can result in a "heat island effect" causing ambient air temperatures to be as much as 10° F. higher than in surrounding rural areas.

Radiation Properties

As described in U.S. Pat. No. 7,592,066 (2009) to Shiao et al., conventional asphalt shingles are known to have low heat reflectance in the spectral band associated with solar radiation. This spectral band is predominantly in the near infrared range (700 nm to 2500 nm). As a result, conventional asphalt shingles absorb a large portion of incident solar radiation. This low solar reflectance can be exacerbated with dark coloring of the granules. The patent of Shiao et al. indicates that dark colored asphalt shingles have solar reflectances of only 0.05 to 0.15. The heat absorbing properties of conventional shingles result in elevated roof temperatures that adversely affect shingle service life and cooling requirements. Special treatments can be incorporated to increase the reflectivity of asphalt shingles. These treatments can be applied specifically to the granules or to the entire shingle. The thermal response of a material to incident radiation such as solar radiation is determined by the surface radiation properties. These include the reflectivity, absorptivity, transmissivity and emissivity. Methods described in the prior art to improve the thermal response to solar incidence do so by incorporating features that effect the surface radiation properties. In particular, treatments that increase the surface reflectivity are commonly used. The resulting properties of any such tailoring, including the use of reflective granules, coatings, paints, powders or other means designed to alter the radiation properties in order to improve thermal performance is referred to here as "tailored radiation properties."

The effective directional dependence of reflectivity is strongly influenced by surface properties and orientation. Methods described in the prior art to improve the radiation properties do so with large-scale efforts apparently without considering that these properties can be tailored to have directional preference at the granule level.

Granule Reflectivity

Effective methods for obtaining highly reflective granules have been pursued for many years as illustrated by U.S. Pat. No. 2,732,311 (1956) to Hartwright. Modern efforts have focused on balancing the desire for high reflectivity with that for darker tones. This results in compromising both areas of interest. Many schemes have been developed to accomplish this balance as demonstrated in U.S. Patent Application Publications 2010/0203336, 2010/0151199, 2010/0104857, 2008/0241472 and 2008/0008832 as well as U.S. Pat. Nos. 7,648,755 (2010) to Gross et al. and 7,241,500 (2007) to Shiao et al. These include solar reflective particles dispersed in a binder at a desired depth, coated reflective granules, reflective coatings, multiple coatings, colored particles within a coating and reflective particles within a colored coating. Regardless of these efforts the most reflective roofs commercially prevalent are light in color.

Granule Alternatives

Instead of treating granules to increase their reflectivity, the granules can be replaced with a more reflective material such as the metal flakes described in U.S. Patent Application Publication 2009/0117329. This method can result in improved reflectivity, but requires deviation from the established, efficient and low-cost process of producing rock-based granule-coated shingles. In addition, this method does not take advantage of the extensive availability of aesthetic choices for typical granule-based shingles.

Shingle Treatments

Methods have been developed to increase average resulting shingle reflectivity by applying a layer of reflective material to the surface of the shingle. This reflective layer can be in the form of a paint as in U.S. Patent Application Publication 2009/0317593, U.S. Pat. No. 7,291,358 (2007) to Fensel et al. and U.S. Patent Application Publication 2007/0110961 or a powder as in U.S. Pat. Nos. 7,452,598 (2008) to Shiao et al. and 7,422,989 (2008) to Kalkanoglu et al. This is most effective with the use of highly reflective materials that are generally light in color and these methods produce roofs that are light colored in appearance regardless of the direction from which they are viewed.

U.S. Pat. Nos. 7,291,358 (2007) and 6,933,007 (2005), both to Fensel et al., and U.S. Patent Application Publications 2005/0238848, 2007/0110961 and 2009/0317593 describe the use of two sizes of granules to increase granule coverage. The smaller granules are sized to fit in the interstices between the larger granules thereby reducing the amount of non-reflective asphalt material exposed to solar radiation. This can increase the average resulting shingle reflectance since granules are typically more reflective than the black asphalt substrate. This is most effective with the use of highly reflective granules that are generally light in color. These methods produce roofs that are light colored in appearance regardless of the direction from which they are viewed.

Shaped Shingles

Popular shingle materials have a variety of shapes. Wood shake shingles are very thin at the uppermost end tapering to considerably thicker at the lower, exposed end. Tile shingles have a variety of curved or flat shapes with interlocking features at interfaces designed to prevent water penetration of the shingle system. While there is a variety of shapes of popular shingles, none of the current art designs capitalize on shape to accomplish directional properties. More particularly, there have been no attempts to create shingles with large scale surfaces that face the sun direction and others that face the viewing directions to facilitate directional tailoring for desired properties.

SUMMARY

In accordance with one embodiment, shingle materials comprise an irregular surface having tailored radiation properties and tailored aesthetic properties in separate directions, simultaneously. This provides enhanced thermal performance in the sun direction and aesthetically pleasing visual appearance from viewing directions.

DRAWINGS

Figures

The accompanying drawings serve to elucidate important principles of various embodiments. In such drawings.

Figure 1:
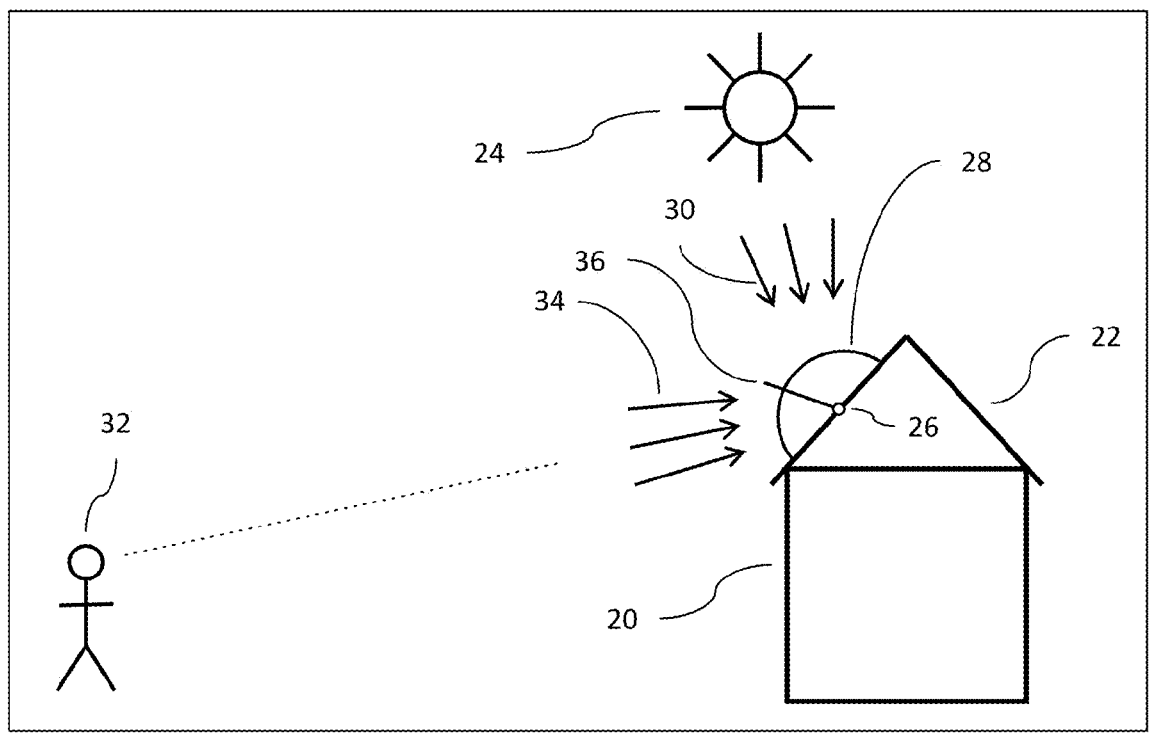
FIG. 1 is an illustration used to describe the "sun-direction" and the "view-direction" for a typical roof.

| DRAWINGS- Reference Numerals | |
| --- | --- |
| 20 | building |
| 22 | roof |
| 24 | sun |
| 26 | fixed point on the roof |
| 28 | hemisphere centered on a fixed point on the roof |
| 30 | the sun-direction |
| 32 | roof observer |
| 34 | the view-direction |
| 36 | demarcation between the sun and view directions |
| 38 | granules with tailored aesthetic properties |
| 40 | asphalt saturated felt or fiberglass |
| 42 | directionally applied coating with high reflectivity |
| 44 | black asphalt shingle with three different surface conditions |
| 46 | section of black asphalt shingle that is untreated |
| 48 | section of black asphalt shingle with uniform white coating |
| 50 | section of black asphalt shingle with directionally applied white coating |
| 52 | highly reflective granules |
| 54 | directionally applied coating with tailored aesthetics |
| 56 | generic granules |
| 58 | small highly reflective granules |
| 60 | roof angle |
| 62 | view direction |
| 64 | view angle |
| 66 | large granule size |
| 68 | small granule size |
| 70 | distance between large granules |

-continued

| DRAWINGS- Reference Numerals | |
|---|---|
| 72 | shingle material shaped for directional properties |

DETAILED DESCRIPTION

Perspective

FIG. 1 illustrates the two directions for an application on a sloped roof. A typical building 20 has a roof 22 that is subjected to incident radiation loads from the sun 24. This incident radiation is in the form of both direct and diffuse radiation; direct passing directly through the atmosphere thereby maintaining its direction, diffuse having been scattered by the atmosphere thereby losing its directional orientation. While the direction of incident radiation is not fixed, it is predominantly coming from directions above the roof, and in particular those directed toward the sun and sky. For any point on the roof 26, local incidence is then predominantly associated with vectors passing through the upper portion of a hemisphere 28 centered on the point. These directions are transient due to the changing position of the sun, but they are predominantly upward. This collection of upward directions is denoted here as the "sun-direction" 30. Whereas the sun direction is predominantly from the upward (or sky) directions, a viewer 32 predominantly observes the roof from the downward (or ground) directions. These directions are variable due to, for example, elevation changes in the local terrain, but they are predominantly from the downward directions. The collection of vectors passing from these prominent viewing directions through the lower portion of the hemisphere to a point on the surface makes up the "view-direction" 34.

The thermal response of a material to incident radiation such as solar radiation is determined by the surface radiation properties. These include the reflectivity, absorptivity, transmissivity and emissivity. The effective directional dependence is strongly influenced by surface properties and orientation. The same properties also influence the visual appearance of a material; that is, surface irregularities and surface radiation properties. All of the methods described in the prior art to improve the thermal response to solar incidence do so by incorporating features that effect the surface radiation properties. In particular, treatments that increase the surface reflectivity are commonly used. The resulting properties of any such tailoring, including the use of reflective granules, coatings, paints, powders or other means designed to alter the radiation properties in order to improve thermal performance is referred to here as "tailored radiation properties." The results of any tailoring to achieve desired aesthetics are referred to here as "tailored aesthetics." This includes tailoring such as that described in the prior art including the use of colors, texturing, shading, layering or any other means of achieving desired visual effects. With respect to the roofing system of FIG. 1, the predominant payoff of tailored radiation properties is associated with surface properties in the sun-direction since the largest fraction of solar incidence is associated with that direction. On the other hand, the predominant payoff of tailored aesthetics is associated with properties in the view-direction since the surface is predominantly viewed in that direction. What is lacking in the prior art is directionally dependent tailored radiation properties and tailored aesthetics, and in particular tailored radiation properties in the sun-direction and tailored aesthetics in the view-direction. That deficiency is addressed in the following embodiments which provide tailored radiation properties in the sun-direction and tailored aesthetics in the view-direction.

A line depicting demarcation 36 between the two collections of directions making up the sun-direction 30 and the view-direction 34 is shown in FIG. 1. However, there need not be a distinct demarcation between the two directions. Any fraction of all possible directions may be tailored for reflectivity from the sun-direction and aesthetics from the view-direction so long as tailoring of both has been achieved.

Various embodiments provide roofing materials with tailored radiation properties in the sun-direction and tailored aesthetics in the view-direction. High reflectivity of solar radiation in the sun-direction is desirable to extend the service life of the shingles and to reduce heating loads for the building. Visual properties with favorable aesthetics are desired in the view-direction to enhance the attractiveness of the roof. These tailored properties are accomplished by providing directional treatments on irregular surfaces of the roofing materials. The irregular surfaces can be inherently provided by materials common to the current art such as granule-coated asphalt shingles. Asphalt shingles have granules that vary in size, shape and orientation resulting in an irregular surface. The irregular surfaces can also be accomplished through the creation of surface shapes specifically designed to provide orientations in the sun-direction and view-direction.

First Embodiment

Figure 2:
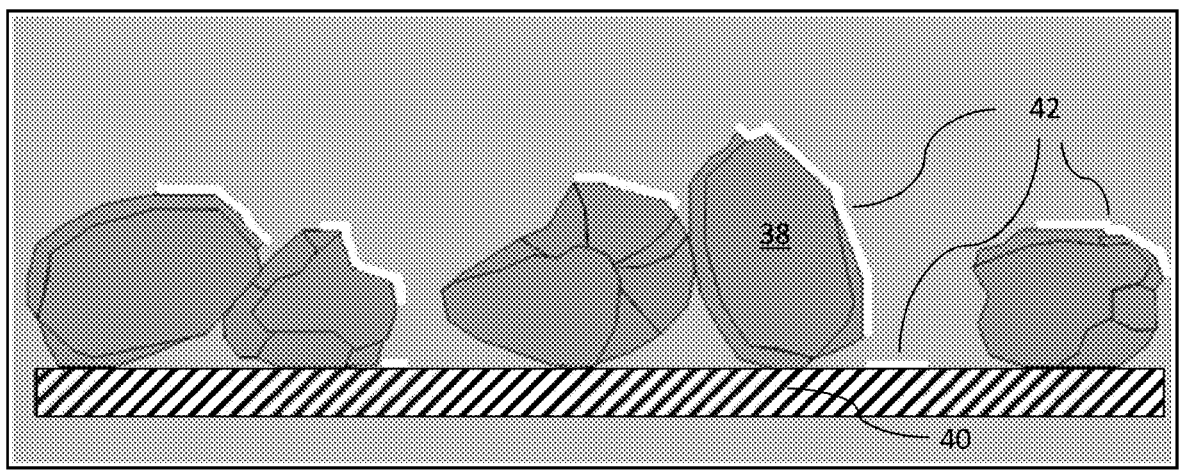
FIG. 2 is an illustration of the cross-section of an asphalt shingle with the dark granules and substrate coated with a material of high reflectivity in the sun-direction.
Figure 3:
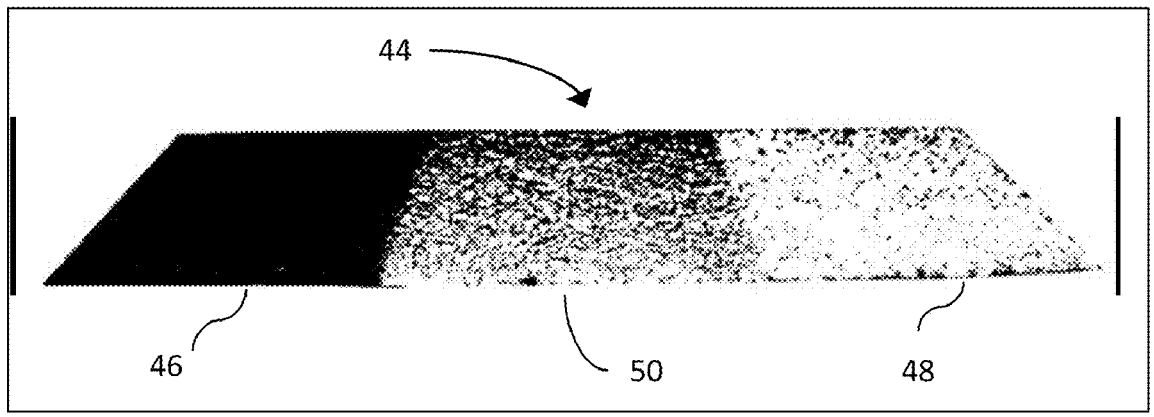
FIG. 3 shows a section of a black asphalt shingle with three types of surface conditions viewed from the sun-direction.
Figure 4:
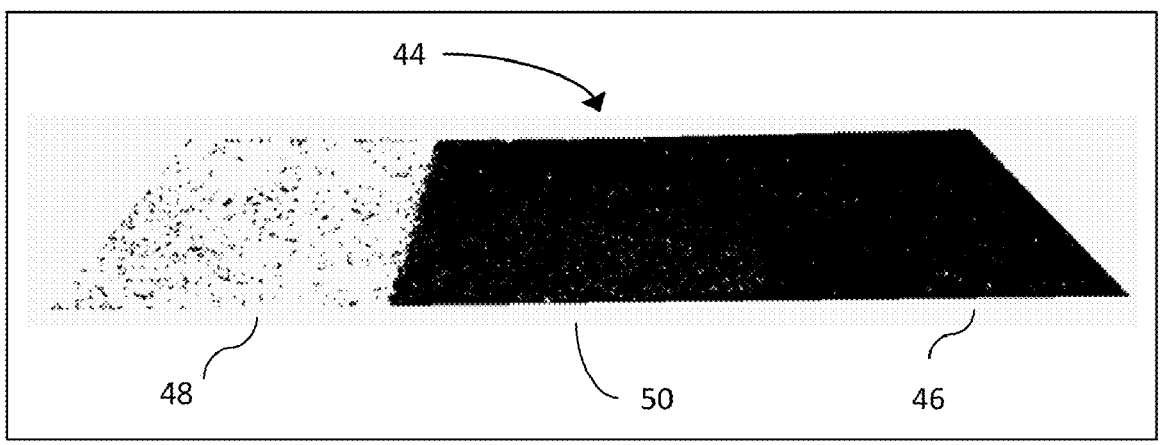
FIG. 4 shows a section of a black asphalt shingle with three types of surface conditions viewed from the view-direction.

FIG. 2 depicts the first embodiment wherein shingle granules with tailored aesthetics 38 are adhered to an asphalt-impregnated substrate such as felt or fiberglass 40. The granules are then directionally coated with material with tailored radiation properties in the form of high reflectivity 42 on the surfaces of the shingles facing the sun-direction. This can easily be accomplished by applying the coating at a consistent predetermined angle with the proper application equipment and settings. The aesthetics of the view-direction are maintained by excluding that direction from high reflectivity treatment. The visual effect of this type of treatment is shown in FIG. 3 which provides a photograph of a section of a black asphalt shingle with three different surface conditions 44; one that remains black 46, one uniformly coated with high reflectivity white coating 48, and one treated with directionally applied high reflectivity white coating 50. In this figure the shingles are photographed from within the sun-direction. From this view, the white 48 and the directionally treated 50 surfaces look similar indicating that the two will have similar reflective properties on surfaces facing the sun-direction. FIG. 4 shows a photograph of the same shingle section taken from within the view-direction. Here the directionally treated surface 50 appears similar to the untreated black surface 46, illustrating that the two have similar aesthetics from the view-direction.

Testing was done using the asphalt shingle samples shown in FIGS. 3 and 4 to compare the temperature response to solar heat flux of black shingle material (black), black shingle material uniformly coated with white coating (white) and black shingle material with a directionally applied white coating (black/white). The shingle samples were attached to an insulating layer of cardboard. Three 20-mil diameter type K thermocouples were positioned between the single material and the cardboard, centered within each sample. The testing was done by placing the test article in direct sunlight in a typical sloped-roof orientation at approximately 3:00 p.m. on a July afternoon in northern Utah. The ambient temperature was 82° F. The samples were left in place until steady-state was reached (as indicated by the thermocouple readings). The black section showed the highest temperature, the white section showed a substantially reduced temperature and the black/white section showed an intermediate temperature (see below). Even more significant results could likely be achieved through optimization of the coating process and material.

| Shingle Treatment | Steady State Temperature ° F. |
|---|---|
| Black | 139.2 |
| Black/White | 129.6 |
| White | 120.5 |

Other Embodiments

Figure 5:
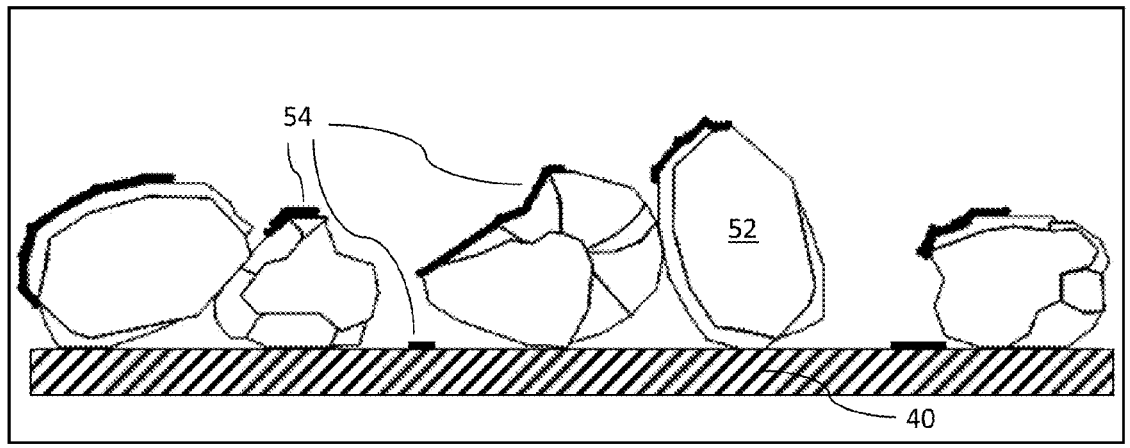
FIG. 5 is an illustration of the cross-section of an asphalt shingle with reflective granules and substrate coated with a dark material in the view-direction.

FIG. 5 depicts another embodiment wherein the rock granules 52 have high reflectivity prior to being adhered to an asphalt-impregnated substrate such as felt or fiberglass 40. In order to tailor the aesthetic properties, the irregular surface of the shingle is directionally treated with a coating 54 to enhance aesthetics on the surfaces of the shingle facing the view-direction. The surfaces facing the sun-direction are unchanged thereby maintaining their high reflectivity in that direction. This can easily be accomplished by applying the coating at a consistent predetermined angle with the proper application equipment and settings.

Figure 6:
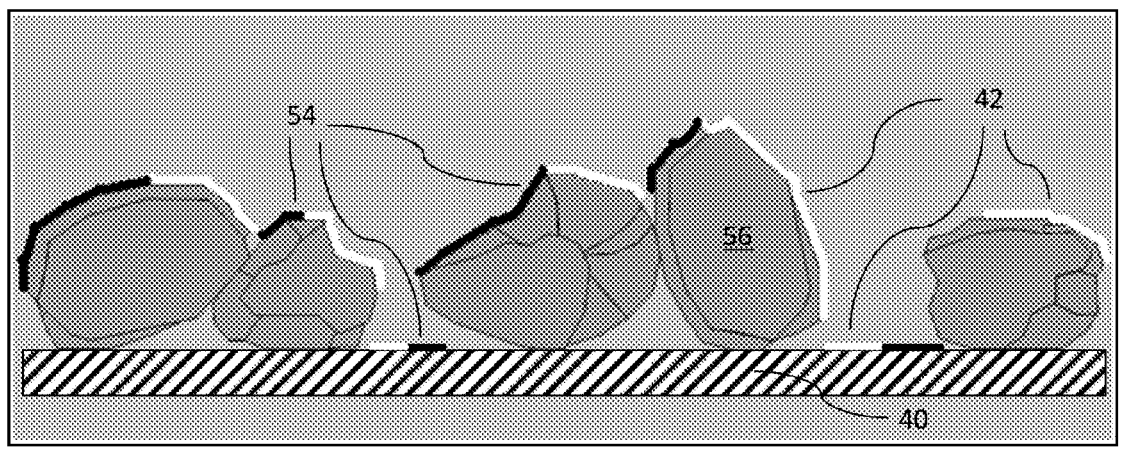
FIG. 6 is an illustration of the cross-section of an asphalt shingle with generic granules and substrate coated with a material of high reflectivity in the sun-direction and a dark material in the view-direction.

FIG. 6 depicts another embodiment wherein generic granules 56 are adhered to an asphalt-impregnated substrate such as felt or fiberglass 40. The granules are then modified with different coatings in the two directions. In order to tailor the aesthetic properties, the irregular surface of the shingle is directionally treated with a coating 54 to enhance aesthetics on the surfaces of the shingle facing the view-direction. The granules are also directionally coated with material with tailored radiation properties in the form of high reflectivity 42 on the surfaces of the shingles facing the sun-direction. This can easily be accomplished by applying the coating a at consistent predetermined angles with the proper application equipment and settings.

Figure 7:
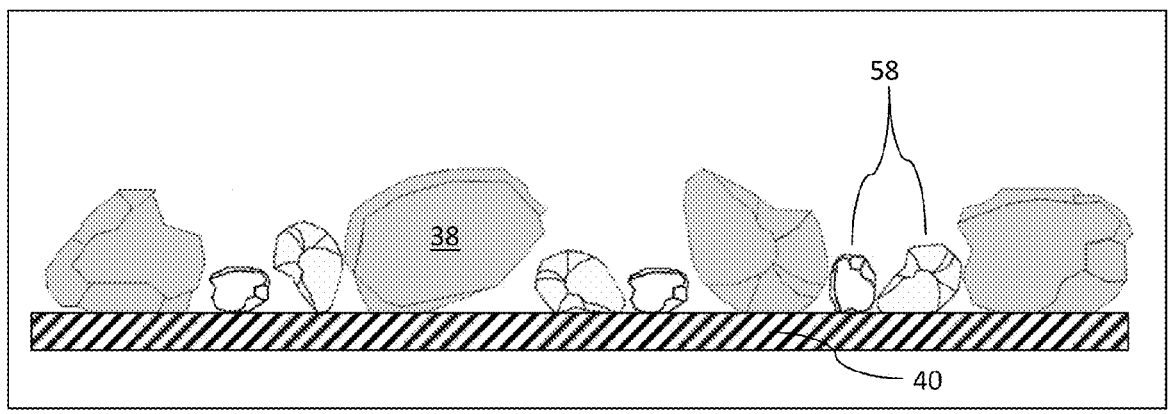
FIG. 7 is an illustration of the cross-section of an asphalt shingle with granules of bimodal size distribution with large dark granules and small reflective granules.
Figure 8:
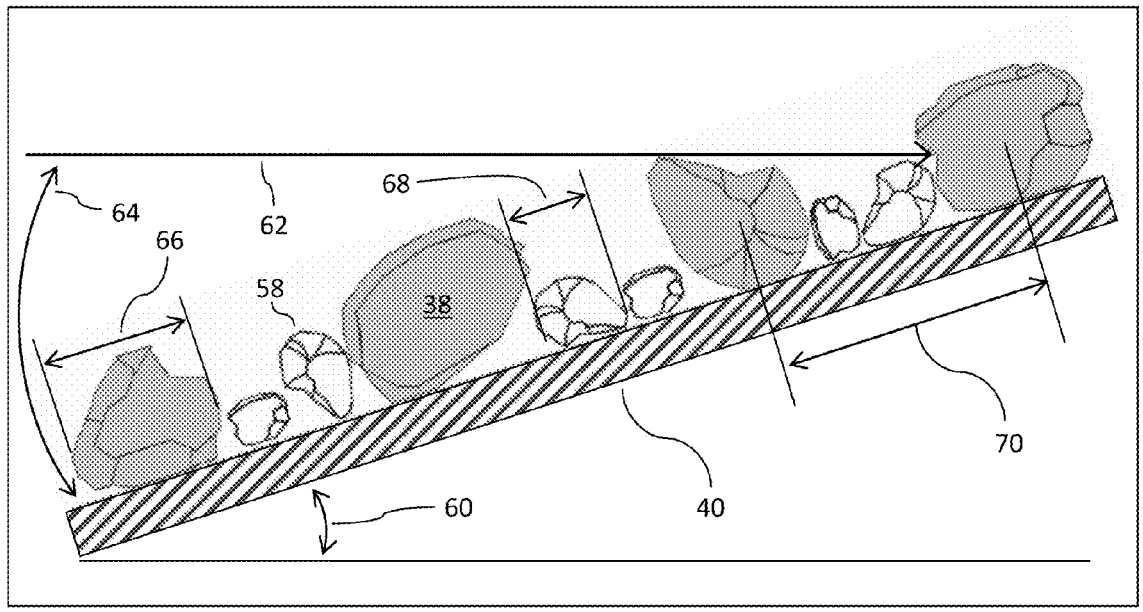
FIG. 8 is an annotated cross-section of an asphalt shingle with granules of bimodal size distribution.

The directionally dependent conditions of enhanced reflectivity in the sun-direction and enhanced aesthetics in the view direction may also be achieved in another embodiment with a multi-modal size distribution of granules are adhered to an asphalt-impregnated substrate such as felt or fiberglass. A bimodal example of such an embodiment is illustrated in FIG. 7. Granules in the smaller size modes 58 are tailored to have highly reflective surfaces. Granules of larger modes have enhanced aesthetics 38. This results in improved reflectivity in the sun-direction since the smaller reflective particles are not blocked from views from above. The smaller reflective particles are somewhat obscured from view in the view-direction by the larger aesthetic particles, resulting in favorable aesthetics in that direction. Various size distributions and proportions can be used to achieve the desired effect. Patterning of the granules can range from random distribution to horizontal stripping with intermittent rows of large and small particles. The effectiveness of this embodiment would be determined by many factors shown in FIG. 8 including the roof angle 60, view direction 62, view angle 64, sizes of the granules 66 and 68, and the distance between the granules 70.

Figure 9:
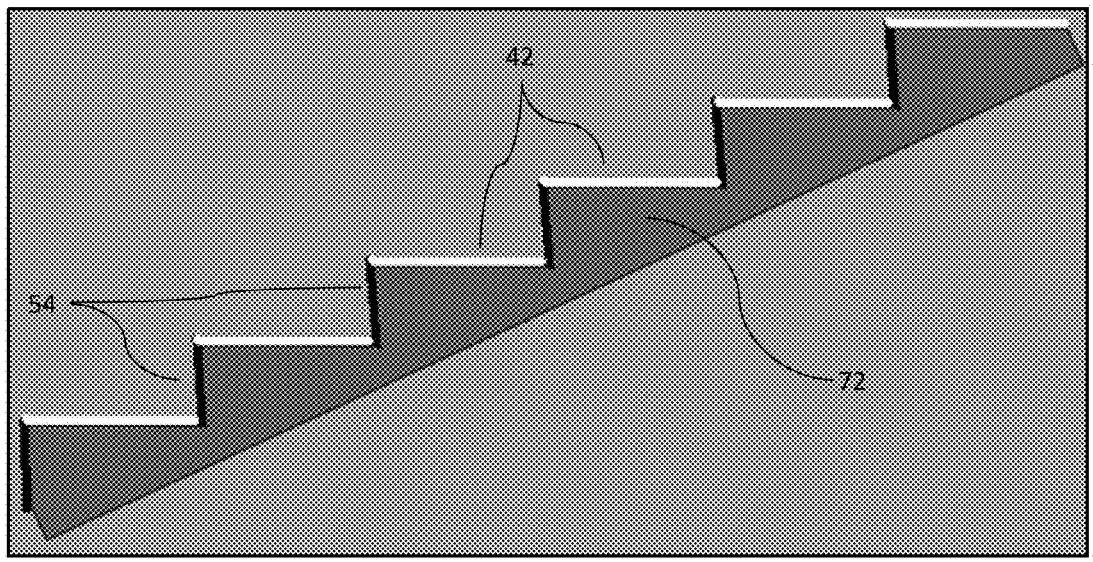
FIG. 9 is an illustration of a stepped shingle tailored to have high reflectivity in the sun-direction and pleasing aesthetics in the view-direction.

Roofing embodiments are not limited to the familiar asphalt shingle. Applications using shingles constructed of any composition such as slate, metal, fibrous cement, ceramics, wood and concrete are possible by shaping and tailoring the surface properties for reflectivity in one direction and aesthetics in another. Such an embodiment is shown in FIG. 9 which illustrates a material of a stepped shape 72 with the faces of the steps facing in different directions tailored to have different properties. In this embodiment the steps facing in the sun-direction are directionally coated with a high reflectivity coating 42 in the sun-direction and have a directionally applied coating with tailored aesthetics 54 applied in the view-direction.

In some embodiments, the coating applied to the roofing material has a thermal reflectivity value of at least approximately 0.6. In some embodiments, the granules forming the non-planar surface of the roofing material have a thermal value of at least approximately 0.6.

CONCLUSIONS, ADVANTAGES AND SCOPE

There is an on-going need for roofing materials that simultaneously provide enhanced aesthetics with enhanced thermal properties. Efforts to date have focused on balancing the desire for high reflectivity with that for darker tones, resulting in compromising both areas of interest. It appears that nothing short of tailoring properties of shingles at the granule level or with other irregularities in the surface such as angled steps to accomplish directional properties will be able to satisfy both needs simultaneously. This has not been accomplished by the prior art.

As described above, some of the embodiments provide a roofing material with both tailored radiation properties and tailored aesthetics. More importantly, these embodiments allow for a product with directionally specific tailoring of these two properties in order to reduce the inevitable compromise between the two. This provides a material that is marketable due to its tailored aesthetics and at the same time has a high reflectivity so that service temperatures are reduced. This results in increased effective service life and a reduction in cooling loads for the building. Furthermore, the shingles manufactured with directionally dependant properties has the following additional advantages:

it permits the production of directionally propertied shingles by the introduction of a simple coating process or two that lend themselves very well to current production techniques;

it permits the production of directionally propertied shingles by adding an additional granule size to current production techniques; and it permits the production of directionally propertied shingles with a shape change in conjunction with the aforementioned adjustments.

Although the description above contains much specificity, these should not be construed as limiting the scope of the embodiments but as merely providing illustrations of some of the presently envisioned embodiments. Thus the scope of the embodiments should be determined by the appended claims and their legal equivalents, rather than by the examples given.

We claim:

1. A roofing material comprising:
   a roofing shingle with at least one non-planar surface for exposure to environmental conditions, wherein the roofing shingle comprises granules of various sizes to form the non-planar surface;
   a coating directionally disposed on a portion of the non-planar surface to cover less than all of the non-planar surface, including a common side of at least some of the granules, and approximately aligned to face a common direction, wherein other remaining portions of the non-planar surface are approximately aligned to face an opposite direction, wherein the coating has an energy-efficiency attribute that is different from a corresponding attribute of the non-planar surface on which the coating is disposed.

2. The roofing material of claim 1, wherein the coating has a thermal reflectivity value that is different from a thermal reflectivity value of the non-planar surface on which the coating is disposed.

3. The roofing material of claim 2, wherein the thermal reflectivity value of the coating is greater than the thermal reflectivity value of the non-planar surface on which the coating is disposed.

4. The roofing material of claim 3, wherein the thermal reflectivity value of the coating is at least approximately 0.6.

5. The roofing material of claim 2, wherein the thermal reflectivity value of the coating is less than the thermal reflectivity value of the non-planar surface on which the coating is disposed.

6. The roofing material of claim 3, wherein the thermal reflectivity value of the non-planar surface to which the coating is applied is at least approximately 0.6.

7. The roofing material of claim 1, wherein the coating is directionally applied to the non-planar surface to present a first visual perception of the coating from a first incident angle that is approximately aligned with an application direction of the coating, and to present a second visual perception of the non-planar surface from a second incident angle that is approximately opposed to the application direction of the coating, wherein the second visual perception of the non-planar surface is different from the first visual perception of the coating.

8. The roofing material of claim 1, wherein the coating is directionally disposed on the non-planar surface to present predominantly a first solar energy interface of the coating for incident solar energy from a sun direction, and to present a second solar energy interface of the non-planar surface for user viewing from a view direction, wherein the first solar energy interface has a greater solar energy efficiency than the second solar energy interface.

9. The roofing material of claim 1, wherein the roofing shingle comprises an asphalt shingle with a base.

10. The roofing material of claim 1, wherein the coating has a visual tone which is lighter than a visual tone of the non-planar surface to which the coating is applied, and the coating is directionally applied from approximately a sun direction relative to an orientation of the roofing shingle.

11. The roofing material of claim 1, wherein the coating has a visual tone which is darker than a visual tone of the non-planar surface to which the coating is applied, and the coating is directionally applied from approximately a view direction relative to an orientation of the roofing shingle.

12. The roofing material of claim 1, wherein the coating comprises a first coating directionally disposed from primarily a sun direction on a first portion of the non-planar surface, wherein the first coating is configured to exhibit relatively higher energy-efficiency properties than the non-planar surface, and the roofing material further comprising a second coating directionally disposed from primarily a view direction on a second portion of the non-planar surface, wherein the second coating is configured to exhibit relatively higher visual aesthetic properties than the first coating or the non-planar surface of the roofing shingle.

13. The roofing material of claim 12, wherein the relatively higher energy-efficiency properties of the first coating are associated with a higher thermal efficiency value, and the relatively higher visual aesthetic properties of the non-planar surface are associated with a darker color tone.

14. The roofing material of claim 1, wherein the energy-efficiency attribute comprises at least one a solar radiation property, wherein a plurality of solar radiation properties comprises reflectivity, absorptivity, transmissivity, and emissivity.

15. The roofing material of claim 1, wherein the coating has a first tonal value, and the other remaining portions of the non-planar surface have a second tonal value that is different from the first tonal value.

16. A method of producing a roofing material, the method comprising:
disposing a coating on a portion of a non-planar surface of a roofing shingle, wherein the roofing shingle comprises granules of various sizes to at least partially form the non-planar surface, wherein the coating is disposed to cover only the portion of the non-planar surface which is approximately aligned to face a common direction, including a common side of at least some of the granules, wherein other remaining portions of the non-planar surface are approximately aligned to face an opposite direction, wherein the coating has an energy-efficiency attribute that is different from a corresponding attribute of the non-planar surface on which the coating is disposed.

17. The method of claim 16, wherein disposing the coating on the portion of the non-planar surface of the roofing shingle further comprises disposing the coating on the portion of the non-planar surface which corresponds to a sun direction, wherein the coating has a thermal reflectivity value that is greater than a thermal reflectivity value of the non-planar surface on which the coating is disposed.

18. The method of claim 16, wherein disposing the coating on the portion of the non-planar surface of the roofing shingle further comprises disposing the coating on the portion of the non-planar surface which corresponds to a view direction, wherein the coating has a visual aesthetic property with a darker color tone than a color tone of the non-planar surface on which the coating is disposed.

19. The method of claim 16, wherein the roofing shingle comprises an asphalt shingle with a base and the granules of various sizes disposed on the base.

* * * * *